United States Patent
Takeuchi et al.

(10) Patent No.: US 8,423,203 B2
(45) Date of Patent: Apr. 16, 2013

(54) SMART KEY SYSTEM

(75) Inventors: Yoshiaki Takeuchi, Wako (JP); Takeshi Konno, Wako (JP); Katsuhisa Yamada, Wako (JP); Sadanori Watarai, Miyazaki (JP); Kazuyuki Kuriyama, Miyazaki (JP); Shuichi Ishibashi, Miyazaki (JP)

(73) Assignees: Honda Motor Co., Ltd., Tokyo (JP); Honda Lock Mfg. Co., Ltd., Miyazaki-Shi, Miyazaki (JP)

( * ) Notice: Subject to any disclaimer, the term of this patent is extended or adjusted under 35 U.S.C. 154(b) by 362 days.

(21) Appl. No.: 12/691,313

(22) Filed: Jan. 21, 2010

(65) Prior Publication Data

US 2010/0191393 A1    Jul. 29, 2010

(30) Foreign Application Priority Data

Jan. 26, 2009    (JP) .................................. 2009-014717

(51) Int. Cl.
*G05D 1/00*    (2006.01)
(52) U.S. Cl.
USPC ............................................................ 701/2
(58) Field of Classification Search ...................... 701/2
See application file for complete search history.

(56) References Cited

U.S. PATENT DOCUMENTS

| | | | |
|---|---|---|---|
| 2004/0196141 A1* | 10/2004 | Yoshida et al. | 340/5.63 |
| 2004/0217846 A1* | 11/2004 | Konno et al. | 340/5.73 |
| 2007/0191998 A1* | 8/2007 | Arie et al. | 701/2 |
| 2007/0197261 A1* | 8/2007 | Humbel | 455/558 |
| 2007/0247280 A1* | 10/2007 | Nakamura | 340/5.72 |
| 2008/0088411 A1 | 4/2008 | Ghabra et al. | |
| 2009/0243796 A1* | 10/2009 | Tieman | 340/5.72 |
| 2010/0007462 A1* | 1/2010 | Biondo et al. | 340/5.72 |

FOREIGN PATENT DOCUMENTS

| | | |
|---|---|---|
| JP | 2005-299305 | 10/2005 |
| JP | 2007009442 | 1/2007 |

OTHER PUBLICATIONS

Canadian Office Action, dated Jul. 6, 2012; Issued on corresponding Application No. 2,690,426.
Office Action dated Jan. 8, 2013 for corresponding Japanese Patent Application No. 2009-014717.

* cited by examiner

*Primary Examiner* — Mary Cheung
*Assistant Examiner* — Michael D Lang
(74) *Attorney, Agent, or Firm* — Squire, Sanders (US) LLP

(57) ABSTRACT

A smart key system according to the present invention controls operations of devices mounted in a vehicle based on wireless communication between a control device mounted in the vehicle and a portable electronic key, and the control device includes a transmission circuit configured to output a request signal a predetermined number of times at predetermined times within a predetermined period in order to confirm authentication communication between the control device and a communication unit of the portable electronic key, and a communication mode switching unit configured to switch an authentication communication interval or an authentication communication time within the predetermined period of the request signal output from the transmission circuit of the control device if the authentication communication is not performed for a predetermined amount of time.

9 Claims, 8 Drawing Sheets

SMART KEY SYSTEM

Priority is claimed on Japanese Patent Application No. 2009-014717, filed on Jan. 26, 2009, the contents of which are incorporated herein by reference.

BACKGROUND OF THE INVENTION

1. Field of the Invention

The present invention relates to a smart key system.

2. Description of the Related Art

Recently, a system (hereinafter, referred to as "smart key system") which enables the locking and opening of doors or a fuel tank cap of a vehicle as well as permission for engine starting without using a mechanical key has been developed. In this smart key system, wireless communication is performed between a portable electronic key which is carried by a user (hereinafter, referred to as "electronic key") and a control device mounted in a vehicle. When a request from a regular user is confirmed by checking the ID data of both sides, the starting of the engine is permitted, for example. In addition, the smart key system is also adopted in two-wheeled vehicles as well as four-wheeled vehicles, and the like.

Further, for example, a communication system by means of a non-contact medium such as a Speed pass (registered trademark) and the like has been used for settling accounts at self-service gas stations or various kinds of eating establishments or the like in recent years. Settlement is made simply by placing the non-contact medium over a reader installed at the gas station or the eating establishment, and thereby the convenience thereof becomes higher.

However, a frequency of a radio wave (for example, 134 kHz) used in the Speed pass (registered trademark) is close to that of a radio wave (for example, 125 kHz) used in the smart key system, and thus the radio wave of the Speed pass (registered trademark) may become a disturbance in a radio wave (for example, a request signal) which is output to the electronic key from a transmitter circuit of the control device mounted in the vehicle. As a result, there is a problem in that authentication of the smart key system is not instantly performed and thereby a time lag for the authentication occurs and the like. In this case, a user cannot determine the disturbance resulting from the Speed pass (registered trademark) as the cause thereof, and may thus feel displeased and incorrectly believe the electronic key to be out of order or the like.

Therefore, in order to counter this, a keyless entry device is provided in which when there are a plurality of communication frequencies and interference is generated in a currently set reception frequency, a transmission frequency of a portable device and a reception frequency of a vehicle-mounted device are changed by operating a frequency setting operation unit so as to cancel the interference (for example, see Japanese Unexamined Patent Application, First Publication No. 2005-299305).

In the conventional technique described above, however, the communication frequency of the keyless entry device is changed, therefore a transmission frequency setting unit for changing a transmission frequency is required to be provided in the portable device and, further, a reception frequency changing unit for changing a reception frequency is also required to be provided in the vehicle-mounted device. Thereby, there is a problem in that circuit configurations of both of the portable device and the vehicle-mounted device become complicated.

Therefore, the present invention was made to solve the problems and an object thereof is to provide a smart key system capable of promptly performing an authentication of a portable electronic key by means of a control device with a simple configuration.

SUMMARY OF THE INVENTION

The present invention adopts the followings in order to solve the problems and thus achieve the associated objects. That is:

(1) A smart key system according to the present invention controls operations of devices mounted in a vehicle based on wireless communication between a control device mounted in the vehicle and a portable electronic key, the control device includes a transmission circuit configured to output a request signal a predetermined number of times at predetermined times within a predetermined period in order to confirm authentication communication between the control device and a communication unit of the portable electronic key, and a communication mode switching unit configured to switch an authentication communication interval or an authentication communication time within the predetermined period of the request signal output from the transmission circuit of the control device if the authentication communication is not performed for a predetermined amount of time.

With the smart key system according to (1) above, when the authentication of the portable electronic key by the control device is not performed even after the elapse of a predetermined time, a communication start timing of authentication communication by another communication system and one of authentication communication by the control device become different from each other due to the changing of the authentication communication interval or the authentication communication time of the request signal output from the transmission circuit by means of the communication mode switching unit. Thereby, even though there are external devices using the communication system in the vicinity of the vehicle, the authentication of the portable electronic key by the control device can be promptly performed as well as it being possible to decrease the probability that the control device will be affected by a disturbance resulting from another communication system.

In addition, complicated circuit configurations need not be provided in both sides of the portable electronic key and the vehicle like the conventional technique and thus an increase in the manufacturing cost can be prevented.

(2) In the smart key system according to (1) above, if the authentication communication is not performed for a predetermined amount of time, the communication mode switching unit may switch a communication mode of a current authentication communication time into a communication mode of an authentication communication time shorter than the current authentication communication time.

With the smart key system according to (2) above, by being switched into the transmission mode in which the authentication communication time of the authentication communication is shorter, the authentication communication of the control device and the portable electronic key can be easily performed while another communication system is not performing authentication communication (interval duration).

(3) In the smart key system according to (1) above, the transmission circuit may include a first transmission mode, and a second transmission mode which is set to be shorter than the first transmission mode in the authentication communication interval or the authentication communication time, and the authentication communication time in the second transmission mode may be set to be shorter than each of authentication communication intervals of authentication communication of another communication system which is installed in a vicinity of the vehicle, the authentication communication intervals of which are known in advance.

With the smart key system according to (3) above, the authentication communication time of the authentication communication in the second transmission mode is set to be shorter than each of the authentication communication intervals of authentication communication of another communication system, and thereby the authentication communication of the control device and the portable electronic key can be easily performed during the interval duration. This enables the suppression of disturbance resulting from another communication system and prompt authentication of the portable electronic key by the control device.

(4) In the smart key system according to (3) above, the period of the authentication communication in the transmission circuit may be set to be longer than a period of the authentication communication in the communication system.

With the smart key system according to (4) above, the period of the authentication communication in the transmission circuit is set to be longer than a period of the authentication communication in the communication system, and thereby the communication start timings of the authentication communication by the communication system and the authentication communication by the control device become different from each other at each period. In other words, the communication start timings shift at each period as much as the difference between the two periods and this enables the portable electronic key to perform the authentication communication in the second transmission mode so that the probability of performing the authentication communication of the portable electronic key is increased while the authentication communication of the communication system is not performed. Thereby, when there are external devices using the communication system in the vicinity of the vehicle and although the radio wave of the request signal output from the control device of the vehicle interferes with a radio wave output from the external device, the probability that the control device will be affected by a disturbance resulting from another communication system can be reduced and the authentication of the portable electronic key can be promptly performed.

(5) In the smart key system according to (3) above, the communication system may further include a plurality of different authentication communication intervals, and a first authentication communication time in the first transmission mode may be set to be shorter than a maximum interval of the plurality of different authentication communication intervals of the communication system, and a second authentication communication time in the second transmission mode may be set to be shorter than a minimum interval of the plurality of different authentication communication intervals of the communication system.

With the smart key system according to (5) above, whichever communication modes are selected, the authentication can be performed during at least one of the plurality of authentication communication intervals of another communication system.

(6) In the smart key system according to (3) above, the communication mode switching unit may switch the communication mode between the first transmission mode and the second transmission mode if the authentication communication between the control device and the portable electronic key is not performed for a predetermined amount of time.

With the smart key system according to (6) above, the request signal of the authentication communication is output to the portable electronic key in any of the transmission modes of the first transmission mode and the second transmission mode by switching the communication mode by the communication mode switching unit. Thereby, the probability that the control device will be affected by a disturbance resulting from another communication system can be reduced and the authentication of the portable electronic key can be promptly performed.

(7) In the smart key system according to (1) above, the vehicle may be a motorcycle, and the device mounted in the vehicle may be an actuator which opens and closes a fuel tank cap of the motorcycle.

With the smart key system according to (7) above, refueling can be smoothly carried out by working the actuator of the fuel tank cap by means of the authentication communication between the control device and the portable electronic key.

(8) In the smart key system according to (3) above, the communication system may be a communication system for performing authentication between a gas stand at a gas station and a non-contact medium.

(9) In the smart key system according to (8) above, the gas station may have a plurality of gas stands, and the authentication communication time in the second transmission mode may be set to be shorter than a minimum interval of authentication communication intervals of the plurality of gas stands.

With the smart key system according to (8) or (9) above, the probability that the control device will be affected by the disturbance resulting from another communication system in the gas station can be reduced and the authentication of the portable electronic key can be promptly performed.

DETAILED DESCRIPTION OF THE INVENTION

Hereinafter, the first embodiment of the present invention will be described with reference to drawings.

Figure 1:
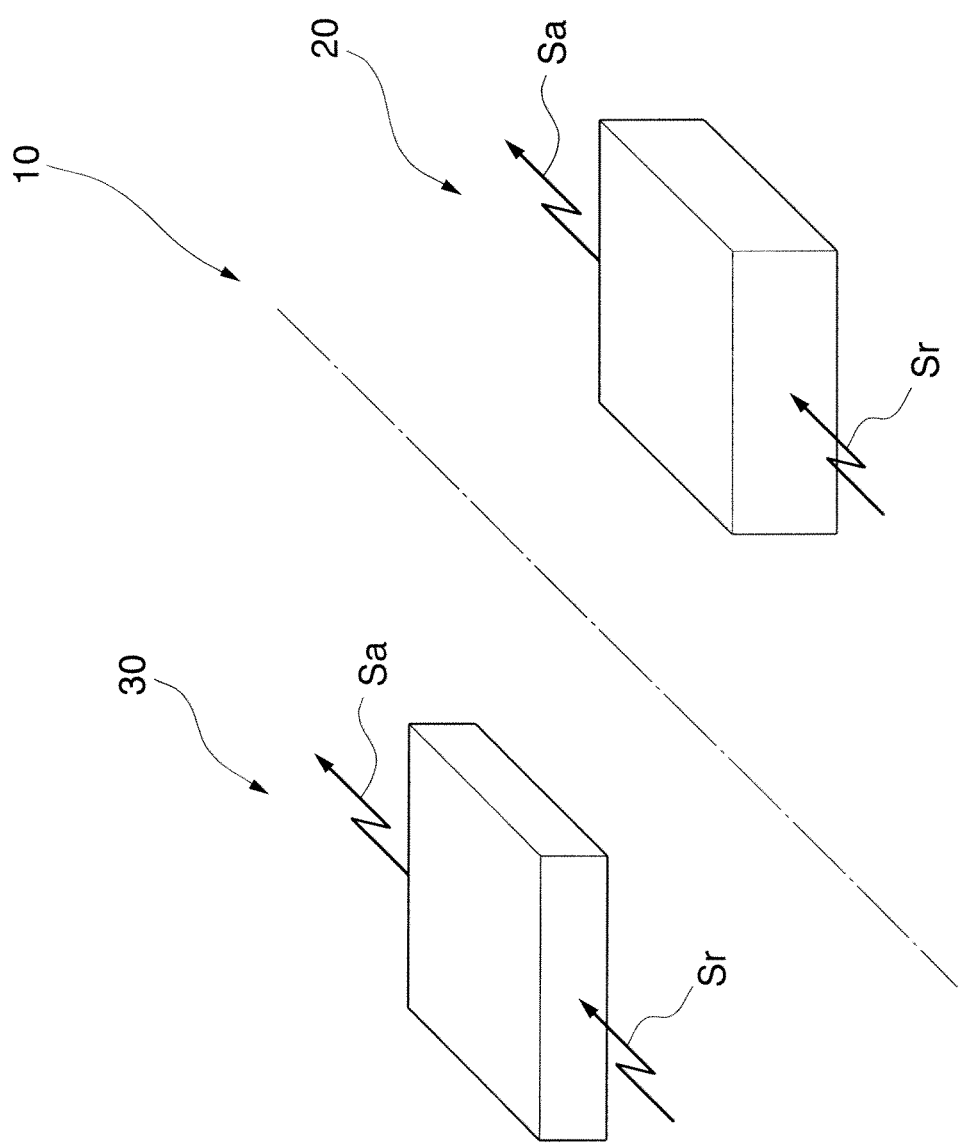
FIG. 1 is a perspective view representing a smart key system according to a first embodiment of the present invention.

As shown in FIG. 1, a smart key system 10 having a control device 20 mounted in a motorcycle 50 (see FIG. 2) and a portable electronic key (hereinafter, referred to as "electronic key") 30 which a user of the motorcycle 50 carries controls an operation of each of electric components 25 of the vehicle (vehicle-mounted device) on the basis of wireless communication between the control device 20 and the electronic key 30.

Figure 2:
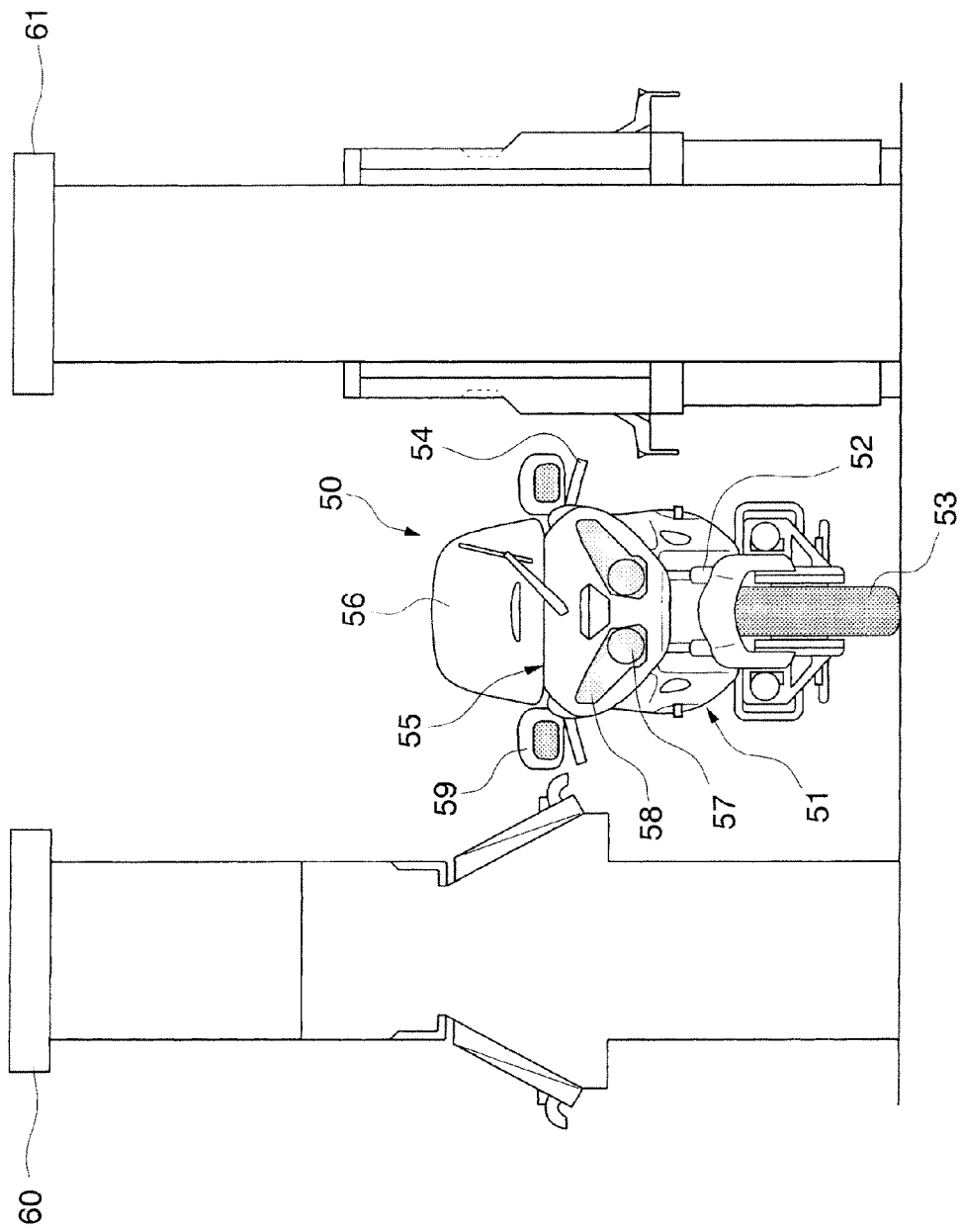
FIG. 2 is a front view representing a state where a motorcycle equipped with the smart key system stops at a gas station.

As shown in FIG. 2, the motorcycle 50, which is a large two-wheeled vehicle of a road sport type, is equipped with a cowl 51 which covers a body frame (not shown); a front fork 52 which is supported at a front end portion of the body frame in order to rotatably move; a front wheel 53 which is rotatably supported at the front fork 52 by an axle; a steering handle 54 connected to an upper end portion of the front fork 52; a front cowl 55 which covers the steering handle 54 from the front face thereof and a screen 56 which stands backwards obliquely from the upper end portion of the front cowl 55. Also, a headlight 57 and a pair of front turn signals 58 are provided in the front side of the front cowl 55 and a pair of rear view mirrors 59 are provided in the lateral sides thereof. The above-described control device 20 is mounted inside this motorcycle 50. In addition, as described later, the motorcycle 50 shown in FIG. 2 stops between neighboring gas stands (first gas stand 60 and second gas stand 61) in a gas station.

Figure 3:
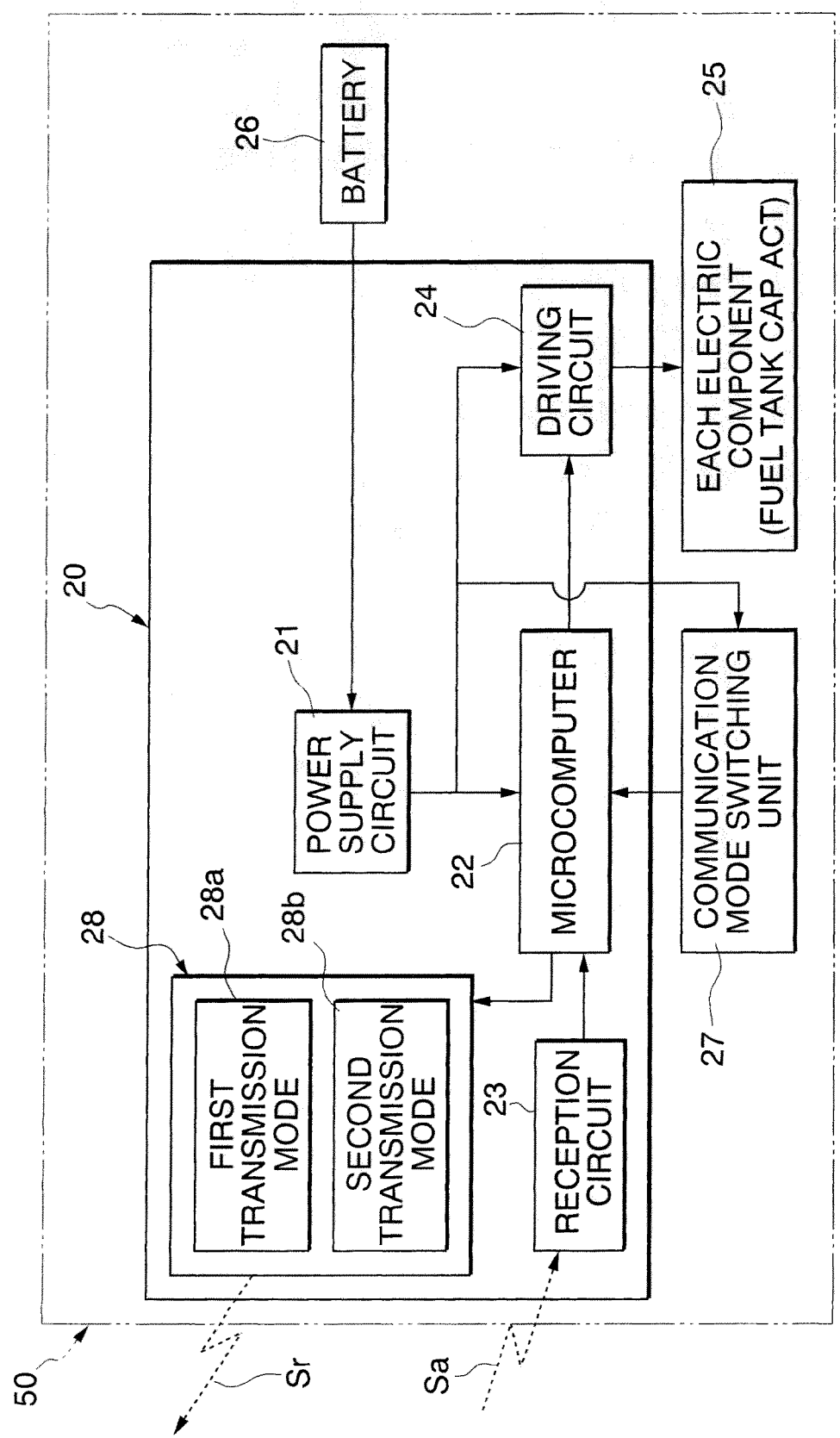
FIG. 3 is a block diagram representing a control device of the motorcycle.

The control device 20 of the motorcycle 50 includes a power supply circuit 21, a microcomputer 22, a reception circuit 23, a transmission circuit 28, a communication mode switching unit 27 and a driving circuit 24, as shown in FIG. 3.

The power supply circuit 21 supplies a power supplied from a battery 26 to the microcomputer 22, the reception circuit 23, the transmission circuit 28, the communication mode switching unit 27, the driving circuit 24, and each of the electric components 25 and so on.

The reception circuit 23 has a reception antenna (not shown), receives a command signal Sa transmitted from the electronic key 30 via this antenna, takes it from a carrier and then outputs a demodulated signal to the microcomputer 22. In addition, the command signal Sa output from the electronic key 30 includes data indicating operation patterns commanded by a user such as the opening of a fuel tank cap and so on, and ID data of the electronic key 30.

The microcomputer 22 receives the command signal Sa demodulated by the reception circuit 23 and checks the ID data of the command signal Sa with ID data stored in a ROM (not shown). When the check for the ID data is right, the microcomputer 22 outputs a signal (hereinafter, referred to as "ON signal") for operating the driving circuit 24.

The driving circuit 24 becomes operable (hereinafter, referred to as "ON state") based on the ON signal from the microcomputer 22 and controls each of the electric components 25 mounted on the vehicle according to the operation pattern data described above. In detail, the driving circuit 24 permits the starting of an engine of the motorcycle 50 based on data indicating an operation pattern of the ON signal and thus enables it to be driven, or controls the opening of the fuel tank cap and the like.

The transmission circuit 28 has a transmission antenna (not shown) and outputs a request signal Sr modulated by a carrier via the transmission antenna in a predetermined authentication range (for example, a radius of about 3 m).

Here, the transmission circuit 28 has the first transmission mode 28a and the second transmission mode 28b which are different from each other in a communication start timing (authentication communication time and authentication communication interval) within one period.

Figure 5:
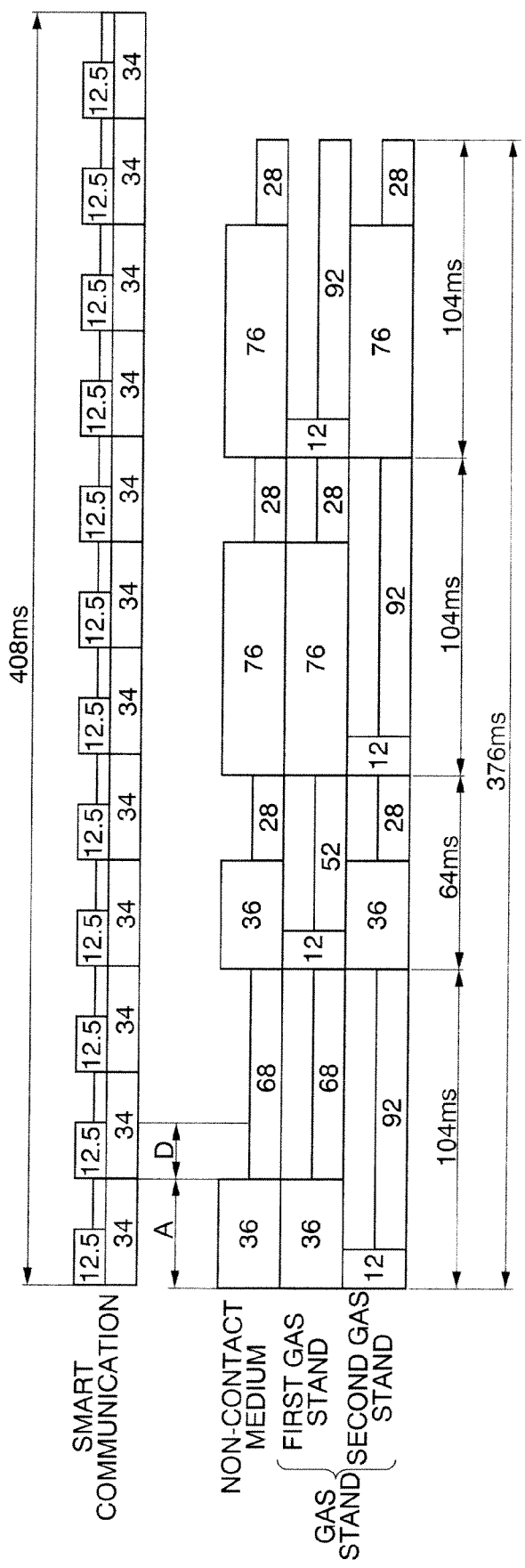
FIG. 5 is a timing chart representing authentication communication of the control device of the first embodiment, a non-contact medium and a gas stand, respectively.

In detail, as shown in FIG. 5, authentication communication is performed twelve times in one period (408 msec) in the first transmission mode 28a, and an authentication communication time of one time (the first authentication communication time) is set to 34 msec. In other words, the request signal Sr is output throughout one period in the first transmission mode 28a.

On the other hand, in the second transmission mode 28b, authentication communication is performed twelve times within one period (408 msec) in the same manner as the first transmission mode 28a, and an authentication communication time of one time (the second authentication communication time) is set to be shorter than that in the first transmission mode 28a. In detail, an authentication communication time of one time is set to 12.5 msec and there is an authentication communication interval of 21.5 msec between the respective authentication communications.

In addition, the communication mode switching unit 27 switches communication modes of the request signal Sr output to the electronic key 30 and can output the request signal Sr for authentication communication to the electronic key 30 by means of any one of the first transmission mode 28a and the second transmission mode 28b which are selected by a user.

Figure 4:
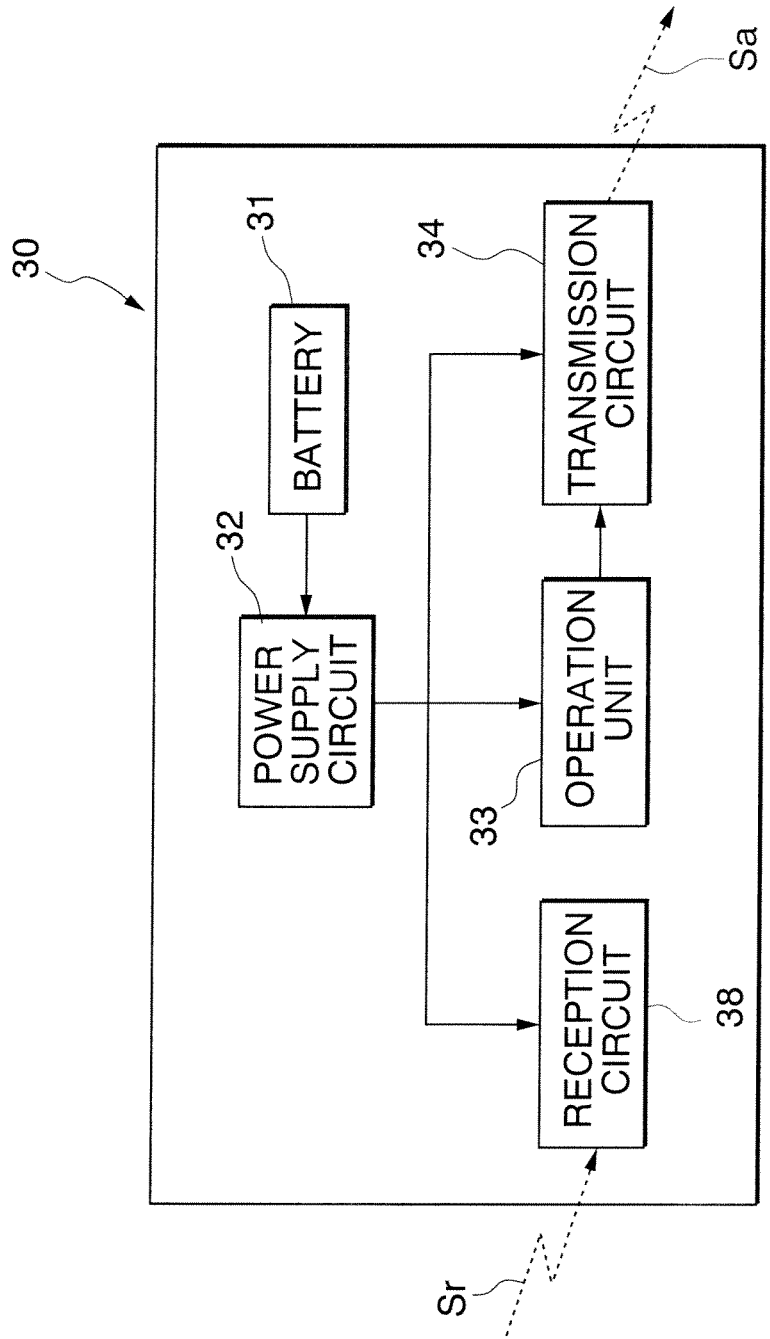
FIG. 4 is a block diagram representing an electronic key in the first embodiment.

The electronic key 30 is formed in a card shape and contains assembled IC chips, including a battery 31, a power supply circuit 32, an operation unit 33, a transmission circuit (communication unit) 34 and a reception circuit 38, as shown in FIG. 4.

The power supply circuit 32 is a circuit for supplying power from the battery 31 to the reception circuit 38, the transmission circuit 34 and the operation unit 33.

The reception circuit 38 has a reception antenna (not shown), receives the request signal Sr output from the above-described transmission antenna of the control device 20 via the reception antenna, and determines whether or not the electronic key 30 is in an authentication range of the control device 20 by demodulating the received request signal Sr.

The operation unit 33 selects operation patterns for operating the respective electric components 25 of the motorcycle 50. The user selects a desired operation pattern by use of the operation unit, and thereby a signal based on the operation pattern is output to the transmission circuit 34 together with ID data.

The transmission circuit 34 has a transmission antenna (not shown) and outputs a command signal Sa, consisting of the operation pattern selected on the operation unit 33 and the ID data and modulated by a carrier, to the above-described reception circuit 23 of the control device 20.

To continue, an operation thereof will now be described. In this embodiment, as shown in FIG. 2, when the above-described motorcycle 50 is refueled with gas between the neighboring gas stands (the first gas stand 60 and the second gas stand 61) in a gas station, a case of opening the fuel tank cap by operating an actuator of the fuel tank cap ("fuel tank cap ACT") among the respective electric components 25 of the motorcycle 50 will be described.

At first, an authentication method of the smart key system 10 at the time of a typical operation will be described. Further, a communication mode of the transmission circuit 28 of the control device 20 is initially set to the first transmission mode 28a.

As shown in FIGS. 3 and 4, in order to authenticate the electronic key 30 and the control device 20, the user carries the electronic key 30 and enters the authentication range of the transmission antenna of the control device 20. In the state where the electronic key 30 enters the authentication range of the transmission antenna of the control device 20, the request signal Sr is output from the transmission antenna of the control device 20 by operating operation switches (not shown) provided in the motorcycle 50. The reception antenna of the electronic key 30 receives the request signal Sr. Thereby, authentication communication of the electronic key 30 and the control device 20 is confirmed.

Next, the command signal Sa is demodulated and output from the transmission circuit 34 of the electronic key 30 based on the received request signal Sr.

In addition, the control device 20 receives the output command signal Sa by the reception circuit 23, and then the reception circuit 23 takes the command signal Sa from the carrier. The reception circuit 23 demodulates the command signal Sa taken from the carrier and outputs it to the microcomputer 22. The microcomputer 22 having received the demodulated command signal Sa reads out the ID data of the motorcycle 50 from the ROM and checks it with the ID data of the command signal Sa. When the ID data of the motorcycle 50 and the ID data of the command signal Sa are identical to each other, the microcomputer 22 completes the mutual authentication and outputs the ON signal to the driving circuit 24.

The driving circuit 24 having received the ON signal opens the fuel tank cap by driving the electric component (in this embodiment, the fuel tank cap ACT) 25 based on the operation pattern.

As shown in FIG. 2, however, when the authentication of the control device 20 of the motorcycle 50 and the electronic key 30 is performed in the vicinity of the gas stands 60 and 61 in the gas station, during the authentication of the gas stands 60 and 61 and another non-contact medium (for example, during authentication of an ID for confirming permission to use the gas stands 60 and 61), the electronic key 30 is sometimes not authenticated. In other words, when the external devices (the gas stands 60, 61) using a frequency close to the frequency of the request signal Sr are present within the authentication range (for example, a radius of about 3 m) of the request signal Sr of the control device 20, radio waves output from antennas (not shown) of the gas stands 60 and 61 interfere with a radio wave of the request signal Sr output from the control device 20. Thereby, there is a problem in that another non-contact medium creates a disturbance in the request signal Sr output from the transmission circuit 28.

Here, as shown in FIG. 5, the non-contact medium communicating with the gas stands 60 and 61 performs authentication communication four times within one period (376 msec), and the first and second authentication communication times are 36 msec, and the third and fourth authentication communication times are 76 msec. Further, interval durations having times different from each other are set between the respective authentication communication times, and an authentication communication interval between the first authentication communication and the second authentication communication is set to 68 msec, and an authentication communication interval between the other authentication communications is set to 28 msec. That is to say, the above-described period (408 msec) of the authentication communication of the electronic key 30 is set to be longer than the period (376 msec) of the authentication communication of the non-contact medium.

Meanwhile, the first gas stand 60 of the gas stands 60 and 61 communicating with the non-contact medium performs authentication communication four times within one period (376 msec) like the non-contact medium, the first authentication communication time is 36 msec, the second and fourth authentication communication times are 12 msec, and the third authentication communication time is 76 msec. Also, interval durations having times different from each other are set between the respective authentication communications, an interval between the first and second authentication communications is set to 68 msec, an interval between the second and third authentication communications is set to 52 msec, an interval between the third and fourth authentication communications is set to 28 msec, and an interval between the fourth authentication communication and the first authentication communication of the next period is set to 92 msec.

In addition, the second gas stand 61 performs authentication communication four times within one period (376 msec) like the non-contact medium, the first and third authentication communication times are 12 msec, the second authentication communication time is 36 msec, and the fourth authentication communication time is 76 msec. Also, interval durations having times different from each other are set between the respective authentication communications, an interval between the first and second authentication communications is set to 92 msec, an interval between the second and third authentication communications is set to 28 msec, an interval between the third and fourth authentication communications is set to 92 msec, and an interval between the fourth authentication communication and the first authentication communication of the next period is set to 28 msec. The non-contact medium and the gas stands 60 and 61 perform the authentication communication during the duration (for example, the duration A in FIGS. 5 and 8) when the mutual authentication communication times overlap.

Figure 8:
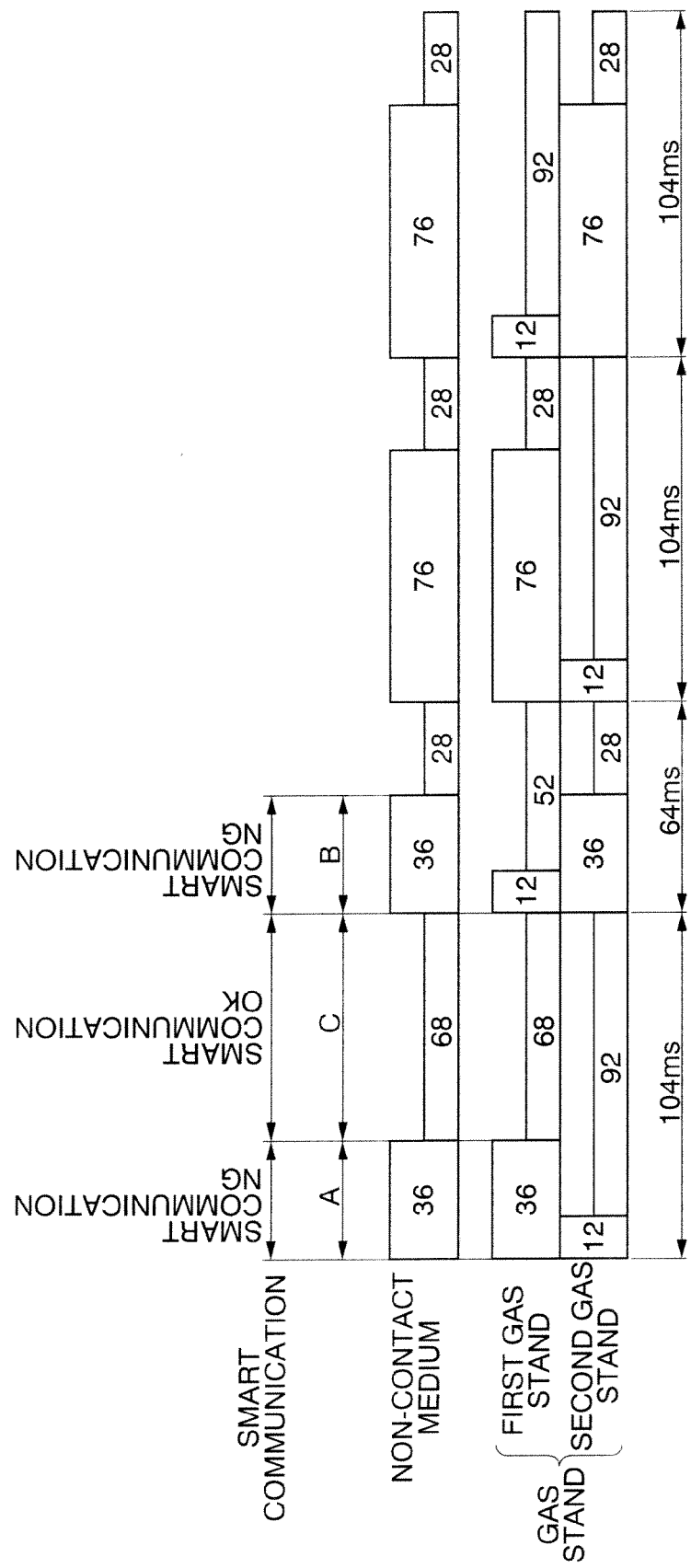
FIG. 8 is a timing chart representing authentication communication of a conventional control device, non-contact medium and gas stand, respectively.

In this case, as shown in FIG. 8, if authentication of the smart key system 10 is to be performed during the authentication time period (for example, the durations A and B in FIG. 8) of the non-contact medium and the gas stands 60 and 61, there is a problem, as described above, in that the radio wave output from the non-contact medium becomes a disturbance on the request signal Sr output from the transmission circuit 28. For this reason, in order to perform the authentication of the smart key system 10 without being affected by the disturbance resulting from the non-contact medium, for example, the authentication of the electronic key 30 and the control device 20 is required to be performed during the interval duration (the duration C in FIG. 8) of the authentication communications of the non-contact medium and the gas stands 60 and 61.

In this case, referring to FIG. 5 again, the authentication communication time in the first transmission mode 28a in the control device 20 is set to 34 msec and is set to be longer than the other authentication communication intervals (28 msec) except for the authentication communication interval (68 msec) between the first authentication communication and the second authentication communication in the non-contact medium. In other words, the authentication communication time in the first transmission mode 28a is set to be shorter than the longest one of the authentication communication intervals of the authentication communication in the non-contact medium. Thereby, the request signal Sr output in the first transmission mode 28a can work only between the first authentication communication and the second authentication communication in the non-contact medium.

Therefore, in this embodiment, when the authentication of the control device 20 and the electronic key 30 is not performed even after the elapse of a predetermined time, that is, when the control device 20 does not react and the fuel tank cap is not open irrespective of the electronic key 30 being present in the authentication range of the control device 20, the user switches the first transmission mode 28a into the second transmission mode 28b by operating the communication mode switching unit 27. Thereby, communication start timings of the authentication communication by the non-contact medium and the authentication communication by the control device 20 become different from each other. Further, the authentication communication time in the second transmission mode 28b is set to be shorter than that in the first transmission mode 28a and is also set to be shorter than the respective authentication communication intervals of the authentication communication in the non-contact medium. Thereby, the authentication communication by the second transmission mode 28b can be performed during the respective interval durations of the authentication communication in the non-contact medium, and thus authentication of the electronic key 30 is easily performed during the interval duration of the authentication communication in the non-contact medium compared with the authentication communication by the first transmission mode 28a.

That is to say, when the authentication communication time of the request signal Sr is included in the interval duration of the authentication communication in the non-contact medium in the state where the electronic key 30 is in the authentication range of the control device 20 (when they completely overlap each other: for example, the duration D in FIG. 5), the reception circuit 38 of the electronic key 30 can receive the request signal Sr.

The command signal Sa is output to the control device 20 from the transmission circuit 34 in this state by operating the operation unit 33 of the electronic key 30. This allows the fuel tank cap to be opened according to the method described above. As above, the refueling can be smoothly carried out by working the fuel tank cap ACT due to the authentication communication between the control device 20 and the electronic key 30.

Therefore, in this embodiment, when the authentication of the control device 20 and the electronic key 30 is not performed in the first transmission mode 28a for a predetermined time, the communication start timings of the authentication communication by the non-contact medium and the authentication communication by the electronic key 30 become different from each other due to being changed by the communication mode switching unit 28 into the second transmission mode 28b having the authentication communication interval and the authentication communication time different from those of the first transmission mode 28a. In detail, the authentication communication time of the authentication communication in the second transmission mode 28b is set to be shorter than the respective authentication communication intervals of the authentication communication in another non-contact medium and thereby the authentication communication by the second transmission mode 28b can be performed during the respective interval durations of the authentication communication in the non-contact medium. For this reason, the authentication communication of the electronic key 30 can be easily performed while the authentication communication of another non-contact medium is not performed. Thereby, it is possible to decrease the probability that the reception circuit 23 of the control device 20 will be affected by disturbance resulting from the non-contact medium even when there are external devices (gas stands 60 and 61) using a frequency close to the frequency of the request signal Sr in the vicinity of the motorcycle 50 in the gas station or the like. Accordingly, the authentication of the electronic key 30 can be promptly performed by the control device 20, and there is no concern that a user will be displeased or incorrectly assume there is a defect in the electronic key 30, etc.

In addition, the communication start timings of the authentication communication by another non-contact medium and the authentication communication by the control device 20 become different from each other at each period by setting the period (408 msec) of the authentication communication in the transmission circuit 28 longer than the period (378 msec) of the authentication communication in another non-contact medium.

In other words, the communication start timings shift at each period as much as the difference between the two periods and this keeps outputting the request signal Sr to the electronic key 30 in the second transmission mode 28b, thereby increasing the probability of performing the authentication communication of the electronic key 30 during the interval duration of the authentication communication of another non-contact medium. Therefore, the authentication of the electronic key 30 can be promptly performed by decreasing the probability that the transmission circuit 28 will be affected by the disturbance resulting from the non-contact medium.

In addition, in this embodiment, the control device 20 side just includes the communication mode switching unit 27 and the respective transmission modes 28a and 28b in order to have a simple configuration, thus complicated circuit configurations need not be provided in both sides of the electronic key 30 and the motorcycle 50 as in the conventional technique and an increase in the manufacturing cost can be prevented.

Next, the second embodiment of the present invention will now be described with reference to FIG. 6. The present embodiment refers as appropriate to FIG. 3, and the same elements as the first embodiment are rendered by the same reference numerals and description thereof will be omitted.

The communication mode of the transmission circuit 28 is manually switched by the operation of a user in the above-described first embodiment; in contrast, the smart key system according to the second embodiment automatically switches the communication mode when authentication is not performed despite outputting the request signal Sr a predetermined number of times.

Figure 6:
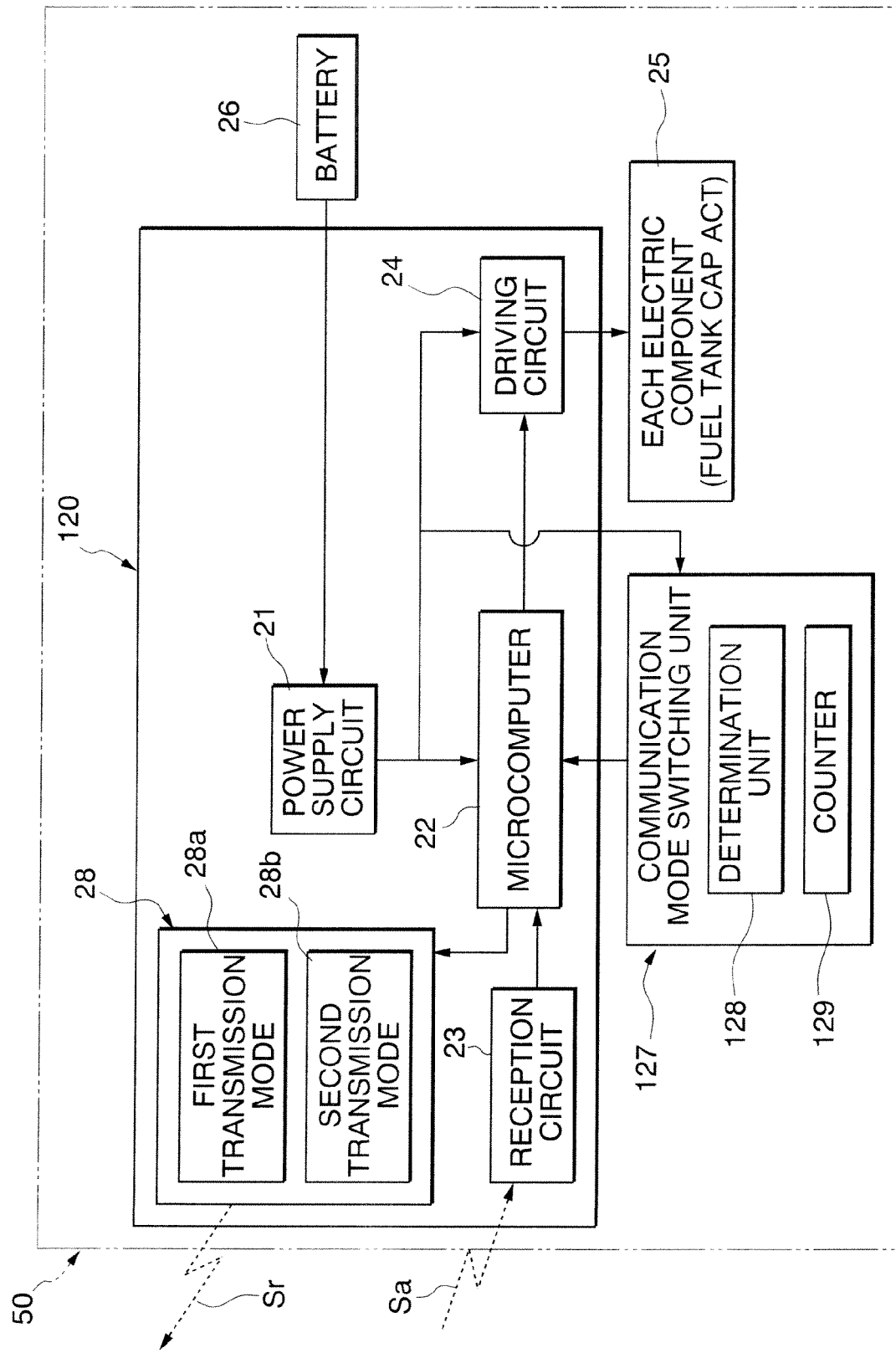
FIG. 6 is a block diagram of a control device according to a second embodiment of the present invention.

As shown in FIG. 6, a communication mode switching unit 127 of a control device 120 includes a determination unit 128 and a counter 129.

The counter 129 counts the number of output times of the request signal Sr from the transmission circuit 28 of the control device 120, in order to perform authentication communication of the electronic key 30 (refer to FIG. 4) and the control device 120. The determination unit 138 reads out the number of output times of the request signal Sr counted by the counter 139 and makes a determination so that a switching is carried out in the transmission circuit 28 when the number of output times exceeds a threshold value.

Figure 7:
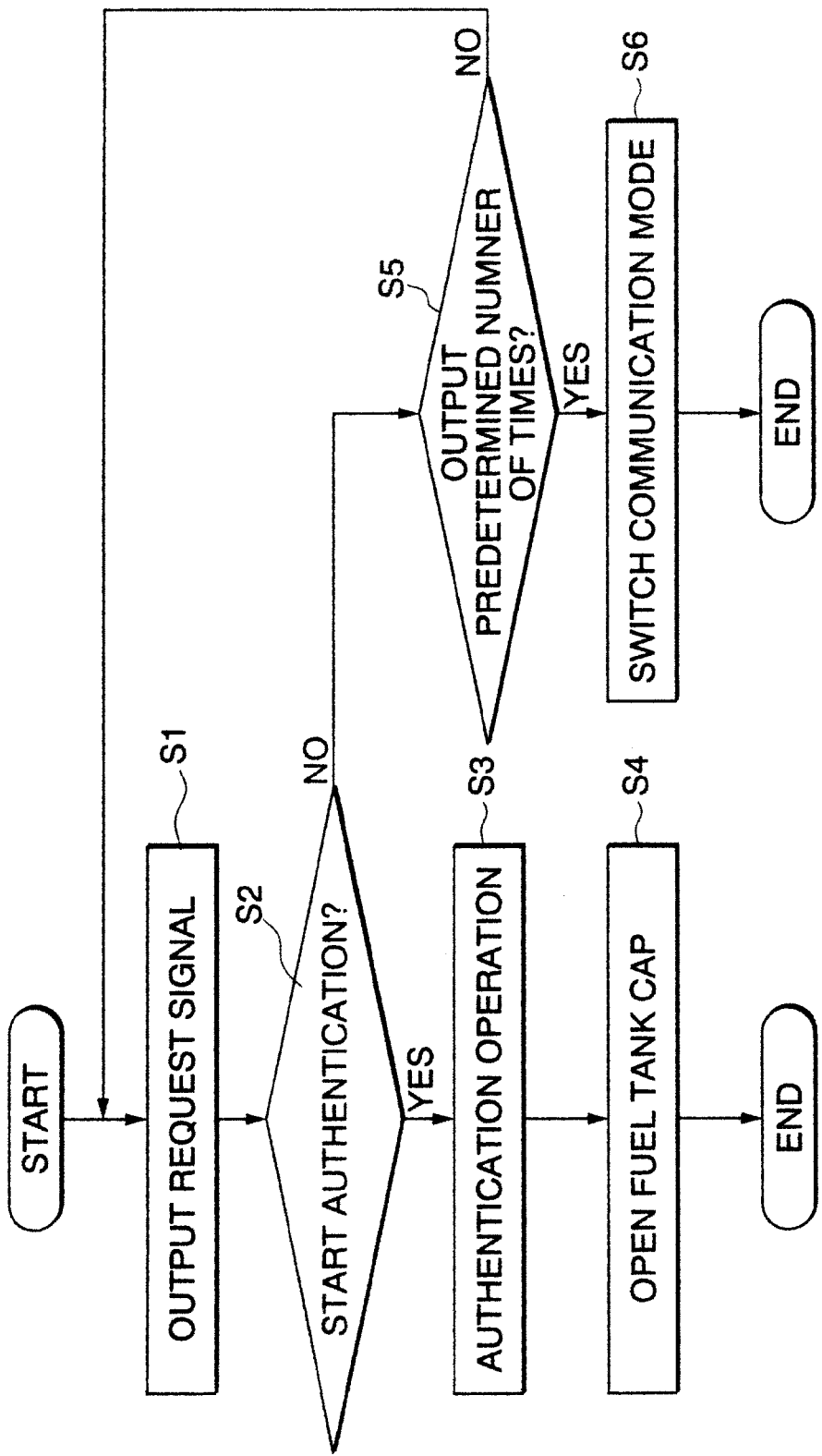
FIG. 7 is a flowchart representing an authentication method according to the second embodiment.

In detail, as shown in the flowchart of FIG. 7, at first, the request signal Sr is output to the electronic key 30 in the first transmission mode 28a in step S1.

Subsequently, in step S2, the electronic key 30 receives the request signal Sr from the control device 120, and it is determined whether or not authentication communication with the electronic key 30 begins.

If the determination result in step S2 is "YES," the electronic key 30 receives the request signal Sr from the control device 120, it is determined that the authentication communication of the control device 120 and the electronic key 30 begins, and the process goes to step S3.

In step S3, in the same manner as the above-described first embodiment, the control device 120 receives, by the reception circuit 23, the command signal Sa output from the electronic key 30, demodulates the received the command signal Sa and outputs it to the microcomputer 22. The microcomputer 22 checks the ID data of the motorcycle 50 and the ID data of the command signal Sa. When mutual authentication between the ID data of the motorcycle 50 and the ID data of the command signal Sa is completed, the driving circuit 24 is driven in order to open the fuel tank cap (step S4).

On the other hand, if the determination result in step S2 is "No" (if the authentication with the electronic key 30 is not performed despite outputting the request signal Sr a predetermined number of times), it is determined that there is concern about the interference of a radio wave output from antennas (not shown) of the gas stands 60 and 61 with the request signal Sr output from the control device 120, and then the process goes to step S5.

Next, in step S5, it is determined whether or not the transmission mode is switched, based on the number of output times of the request signal Sr counted by the counter 139. In detail, the determination unit 138 determines whether or not the number of output times of the request signal Sr counted by the counter 139 exceeds a threshold value. If the determination result in step S5 is "NO" (if the value counted by the counter 139 is smaller than the threshold value), it is determined that more time is needed for communication, not that there is interference, and then the process reiterates the flow from step S1.

On the other hand, if the determination result in step S5 is "YES" (if the value counted by the counter 139 is equal to or more than the threshold value), it is determined that the radio wave from the gas stands 60 and 61 interferes with the request signal Sr from the control device 120, and then the process goes to step S6.

In step S6, the determination unit 138 enables the transmission circuit 28 to carry out a switching operation. In detail, the communication mode switching unit 127 outputs a switching signal to the transmission circuit 28 via the microcomputer 22 and the transmission circuit 28 switches the communication mode from the first transmission mode 28*a* to the second transmission mode 28*b* based on the switching signal, in the same manner as the first embodiment.

Thereafter, the control device 120 performs authentication with the electronic key 30 by use of the second transmission mode 28*b* according to the flow identical to the above-described flow. That is, in this embodiment, the first transmission mode 28*a* and the second transmission mode 28*b* are alternately switched by the communication mode switching unit 127 until the authentication is completed.

According to this embodiment, in addition to achieving the same effect as the above-described first embodiment, it is possible to automatically determine disturbance resulting from other non-contact media without the switching operation of the transmission circuit 28 by a user. Therefore, the operational complexity and difficulty in making a determination of disturbance can be solved in order to improve the operability, a user is not displeased and the electronic key 30 can be promptly authenticated by the control device 120.

In addition, the communication mode switching unit 127 may determine disturbance based on a period, as well as determine it based on the number of output times of the request signal Sr. Furthermore, the transmission circuit 28 may be configured to be switched at a time point when an output time of the request signal Sr exceeds a predetermined time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the cases of switching the two communication modes in the transmission circuit have been described in the first and second embodiments; however, these are not limiting and a plurality of kinds of communication modes may be employed. Also, an authentication communication time and an authentication communication interval may be appropriately adjusted.

Further, the case where the above-described motorcycle 50 stops between the neighboring gas stands 60 and 61 in a gas station and is refueled with gas has been illustrated in these embodiments; however, this is not limiting and the present invention is also applicable under various circumstances where there are external devices using frequencies close to the frequency of the radio wave (request signal Sr) used by the smart key system 10.

Also, in these embodiments, the case where the transmission circuit 28 has the two communication modes of the first transmission mode 28*a* and the second transmission mode 28*b* has been illustrated; however, this is not limiting and the transmission circuit 28 may have two transmission circuits, for example, such as a first transmission circuit and a second transmission circuit, having different communication modes.

Further, the smart key system according to the present invention may be mounted in a three-wheeled vehicle or a four-wheeled vehicle and is not limited to the two-wheeled vehicle.

What is claimed is:

1. A smart key system, which controls operations of devices mounted in a vehicle based on wireless communication between a control device mounted in the vehicle and a portable electronic key, wherein the control device comprises:
   a transmission circuit configured to output a request signal a predetermined number of times at predetermined times within a predetermined period in order to confirm authentication communication between the control device and a communication unit of the portable electronic key; and
   a communication mode switching unit configured to switch an authentication communication interval or an authentication communication time of the request signal output from the transmission circuit of the control device if the authentication communication is not successful for a predetermined amount of time.

2. The smart key system according to claim 1, wherein if the authentication communication is not performed for a predetermined amount of time, the communication mode switching unit switches a communication mode of a current authentication communication time into a communication mode of an authentication communication time shorter than the current authentication communication time.

3. The smart key system according to claim 1, wherein the transmission circuit comprises:
   a first transmission mode; and
   a second transmission mode which is set to be shorter than the first transmission mode in the authentication communication interval or the authentication communication time, wherein
   the authentication communication time in the second transmission mode is set to be shorter than each of authentication communication intervals of authentication communication of another communication system which is installed in a vicinity of the vehicle and the authentication communication intervals of which are known in advance.

4. The smart key system according to claim 3, wherein the period of the authentication communication in the transmission circuit is set to be longer than a period of the authentication communication in the communication system.

5. The smart key system according to claim 3, wherein:
   the communication system further includes a plurality of different authentication communication intervals;
   a first authentication communication time in the first transmission mode is set to be shorter than a maximum interval of the plurality of different authentication communication intervals of the communication system; and a second authentication communication time in the second transmission mode is set to be shorter than a minimum interval of the plurality of different authentication communication intervals of the communication system.

6. The smart key system according to claim 3, wherein the communication mode switching unit switches the communication mode between the first transmission mode and the second transmission mode if the authentication communication between the control device and the portable electronic key is not performed for a predetermined amount of time.

7. The smart key system according to claim 3, wherein the communication system performs authentication between a gas stand in a gas station and a non-contact medium.

8. The smart key system according to claim 7, wherein:

the gas station has a plurality of gas stands; and the authentication communication time in the second transmission mode is set to be shorter than a minimum interval of authentication communication intervals of the plurality of gas stands.

9. The smart key system according to claim 1, wherein:

the vehicle is a motorcycle; and the device mounted in the vehicle is an actuator which opens and closes a fuel tank cap of the motorcycle.

* * * * *